J. H. CORTHESY.
DISTILLATION OF LIQUID HYDROCARBONS AND APPARATUS THEREFOR.
APPLICATION FILED APR. 29, 1919.

1,316,770.

Patented Sept. 23, 1919.

Witness
J. K. Moore
R. E. Barry

Inventor
Jules H. Corthesy
By
Whitaker & Prevost
attys

UNITED STATES PATENT OFFICE.

JULES HIPPOLYTE CORTHESY, OF BARNSBURY, LONDON, ENGLAND, ASSIGNOR OF ONE-HALF TO SAVERIO THOMAS STEPHEN CASTELLI, OF KENSINGTON, LONDON, ENGLAND.

DISTILLATION OF LIQUID HYDROCARBONS AND APPARATUS THEREFOR.

1,316,770.  Specification of Letters Patent.  Patented Sept. 23, 1919.

Application filed April 29, 1919. Serial No. 293,486.

*To all whom it may concern:*

Be it known that I, JULES HIPPOLYTE CORTHESY, a citizen of the Republic of Switzerland, residing at 50 Thornhill Houses, Barnsbury, London, England, have invented new and useful Improvements Relating to the Distillation of Liquid Hydrocarbons and Apparatus Therefor, of which the following is a specification.

This invention relates to the treatment of liquid hydrocarbons chiefly designed for the separation of the lighter oils or fractions from the heavier ones and has for its object to perform this operation more rapidly and economically than by the processes now in use.

According to this invention the oil to be treated, instead of being supplied in a body to the evaporating vessel is introduced in the form of drops or spray, and is subjected therein to a whirling, vortex or like action at such a velocity that the heavier particles which are not at once volatilized will be thrown by centrifugal action toward the wall of the evaporating vessel while the lighter or more volatile portion will occupy the center of the vortex and be conveyed from the center of the said evaporating vessel to a condenser, or to a point at which the vapor is to be utilized. The unvolatilized portion of the liquid or vapor which is thrown toward or against the walls is discharged through a suitable outlet or outlets into a receptacle for receiving it, or enters another evaporating vessel heated to a different temperature and so on.

The whirling or vortex action is produced by returning a portion of the vapor into the evaporating chamber at a suitable velocity and superheated, or by a separate current of gas similar to that from the liquid being distilled and having the required degree of heat for effecting the distillation.

A suitable arrangement of apparatus for carrying out this invention is illustrated in the accompanying drawings, in which:—

$a$ indicates a cylindrical evaporating vessel which, as shown, is arranged over a chamber $b$ which may be fitted as a furnace, $c$ indicating the flue for the escape of the products of combustion therefrom.

$d$, $d$ indicate a series of holes or perforations in the upper end of the cylinder through which the crude petroleum or other liquid to be treated is introduced into the said cylinder from the supply pipe $e$, and $f$ is a nozzle in the bottom of the cylinder through which the unvolatilized portion of the liquid is discharged. The volatilized portion of the liquid is taken off from the center of the vessel through the pipe $g$ which extends through a cooling tank $h$ provided with circulating pipes $i$, $i$. Connected to the pipe $g$ in the upper part of the tank $h$ are coils $k$, $k$ through which the vapor passes, a partition $k^1$ being placed across the pipe $g$ to cause the vapor to be condensed to pass through the said coils, the liquid of condensation passing into the lower part of the said pipe $g$ and being discharged through the pipe $l$.

$m$ indicates an annular passage which is formed around the cylinder $a$ and which communicates with the interior of the said cylinder through a series of tangential apertures $n$, $n$. This annular passage $m$ is connected by a by-pass pipe $o$ to the pipe $g$ and has arranged in its length a rotary fan $p$ which may be driven in any suitable manner, the said fan serving to draw vapor from the pipe $g$ and to deliver it into the annular passage $m$ whence it passes through the tangential apertures $n$ into the cylinder $a$ to produce the vortex action therein hereinbefore referred to. Instead of the annular passage and series of tangential openings only one of such openings may be employed.

Figure 1:
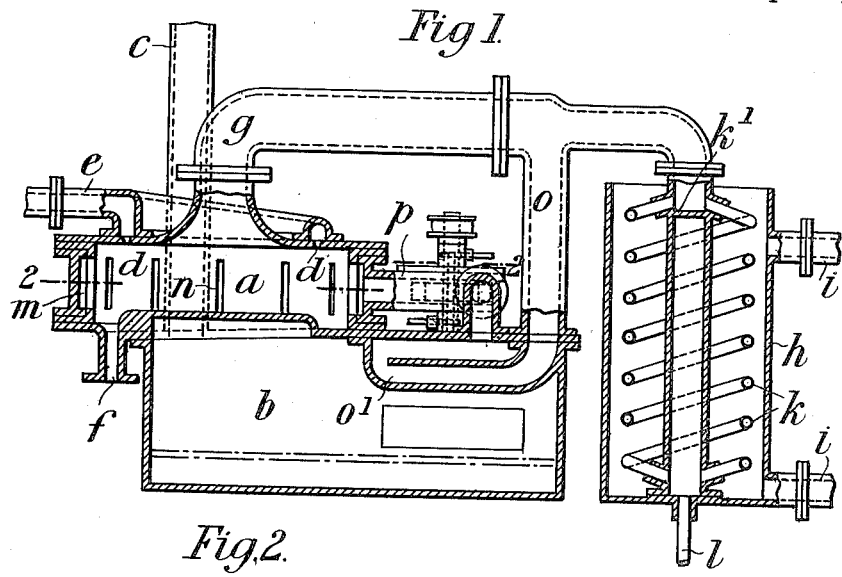
Figure 1 is a sectional side elevation of such apparatus.
Figure 2:
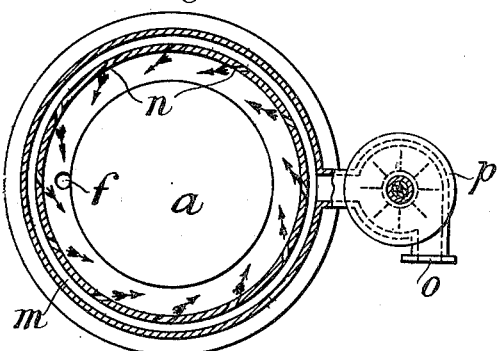
Fig. 2 is a horizontal section on the line 2—2, Fig. 1.

In practice the pipe $g$ is advantageously contracted adjacent to the fan inlet and in order to check the flow of vapor adjacent to such inlet and thus render a portion thereof available for introduction into the chamber $a$ as hereinbefore described. In order to heat to the required temperature the vapor delivered into the evaporating vessel $a$ the passage $o$ is preferably extended through the furnace chamber $b$ as indicated at $o^1$ in Fig. 1 and in order that the fan $p$ shall not be damaged by the heated gases its driving shaft is advantageously made hollow to allow of a water circulation therethrough.

With the arrangement hereinbefore described it will be understood that the whirling or vortex action is maintained without the introduction of steam, heated air or other foreign vapors into the evaporating vessel. If desired, however, provision may be made for introducing such foreign vapor into the system.

As hereinbefore stated, the portion of the liquid unvolatilized in the cylinder $a$ and discharged through the pipe $f$ may be passed into another evaporator heated to a different temperature.

Figure 3:
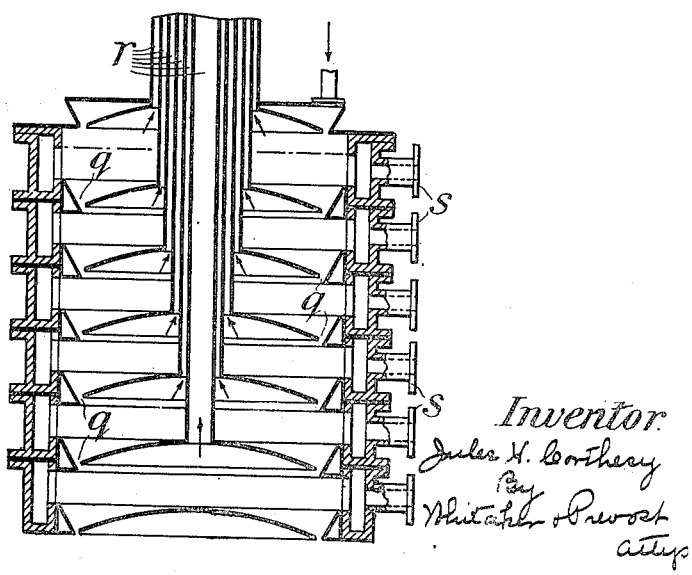
Fig. 3 is a vertical section of an apparatus for effecting a fractional distillation.

Instead of employing a single cylinder as hereinbefore described I may employ a series of superposed cylinders through which the crude oil will successively pass through annular spaces $q$, $q$ or suitable perforations, each chamber being provided with an independent outlet for the distilled vapor the outlets of the several chambers being concentric as illustrated at $r$ in Fig. 3. The several chambers are heated to different temperatures, the upper one being subjected to the lowest temperature and the temperatures rising throughout the series toward the lowest chamber. In this case separate fans would be provided in connection with the several chambers, each drawing its supply of vapor from the particular discharge pipe from the chamber in connection with the fan and returning the vapor through one of the vapor inlets $s$, such supply being heated during its passage to and from the chamber by any suitable heating device.

Claims:

1. A method of distilling liquid hydrocarbons consisting in introducing such hydro-carbons into a vessel in the form of drops or spray and subjecting them therein to the action of a heated current of gas similar to that to be produced and moving in a circular or like path at such velocity that centrifugal action will be set up which will cause the separation of the unvolatilized hydrocarbon from the vapor, substantially as described.

2. In a method of distilling liquid hydrocarbons as claimed in claim 1, the utilization of a superheated portion of the vapor distilled from the hydro-carbons being treated for effecting such distillation, substantially as described.

3. A method of distilling liquid hydrocarbons consisting in introducing such hydro-carbons into a heated vessel in the form of drops or spray and in subjecting it therein to a whirling or vortex action of a heated current of gas at such a velocity that the heavier particles which are not volatilized will be thrown by centrifugal action toward the wall of the said vessel, and the lighter or volatilized portion will occupy the center of the vortex, substantially as described.

4. An apparatus for the distillation of liquid hydro-carbons comprising a cylindrical vessel designed to be heated and into which the liquid hydro-carbon to be volatilized is introduced in the form of drops or spray, means for subjecting the liquid to a whirling or vortex action in the said chamber and for discharging the volatilized portion thereof through the center of the vessel and the unvolatilized portion near the periphery and means for returning a portion of the volatilized vapor into the chamber to set up a vortex action therein, substantially as described.

5. Apparatus of the kind claimed in claim 4, wherein a series of chambers are superposed and arranged to discharge the vapors produced therein through concentric passages, substantially as described.

JULES HIPPOLYTE CORTHESY.